Dec. 12, 1933.    T. KOPCZYNSKI    1,939,064
DEVICE FOR POWER FACTOR CORRECTION IN ELECTRIC POWER CIRCUITS
Filed Oct. 30, 1931
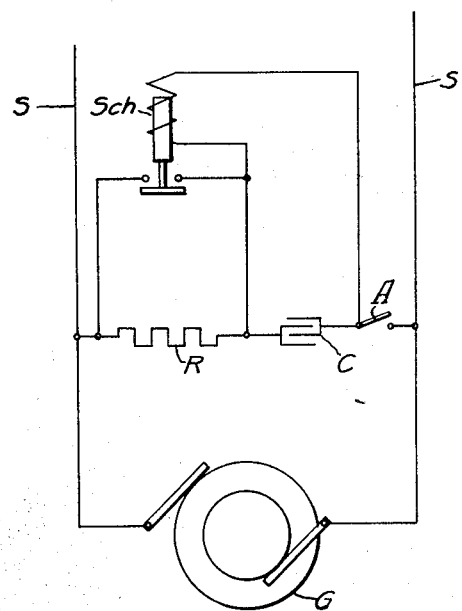
WITNESSES:
INVENTOR
Theodor Kopczynski
BY
ATTORNEY Patented Dec. 12, 1933

1,939,064

UNITED STATES PATENT OFFICE 1,939,064

DEVICE FOR POWER-FACTOR CORRECTION IN ELECTRIC POWER-CIRCUITS

Theodor Kopczynski, Finkenkrug, near Spandau, Germany, assignor to Westinghouse Electric & Manufacturing Company, a corporation of Pennsylvania Application October 30, 1931, Serial No. 572,209, and in Germany November 3, 1930

6 Claims. (Cl. 175—294)

My invention relates to a device for power-factor correction in electric power circuits.

For correcting the power factor in alternating-current networks and alternating-current plants, condensers connected to the conductors of the network are often used. These condensers take leading currents and consequently neutralize the inconvenient inductive reactive currents in the system. When such condensers are joined directly to the network, they take at the first moment when the network is cut in exceedingly large currents which are liable to damage the condensers and the switchgear serving to close the circuit. These drawbacks can be eliminated by inserting resistors in series with the condensers. In service such resistors, however, cause continual losses. The object of my invention is to avoid these losses.

The invention relates to a device for correcting the power factor in heavy-current circuits and consisting of condensers connected to the network through resistors which in service are short-circuited by suitable means. These resistors are short-circuited after the network has been cut in, and the short-circuiting of the resistors is performed, for example, by means of electromagnetic bridging or short-circuiting switches, the exciting windings of which are connected in parallel with the condenser. The electromagnetic bridging switches are so dimensioned as not to operate before the current rush in the condensers taking place when the circuit is closed has died down.

A manner of connecting a condenser of the above kind is shown in the accompanying drawing, in which the single figure is a diagrammatic view of apparatus and circuits giving an example for carrying out the invention. The letter S indicates the busbars of an alternating-current network fed from a generator G. Between the two busbars is connected, by means of a switch A, a device for the correction of the power factor. The device consists of a capacitor or electrostatic condenser C, of the resistor R connected in series with same and of the electromagnetic bridging switch Sch, the contacts of which are shunted across the resistor R and remain short-circuited under service conditions. The exciting coil of the switch Sch is connected in parallel with the condenser C. The switch is so dimensioned that its contacts close with a short time lag when the condenser circuit is switched onto the bus S, by means of the switch A, and when the rush of current taking place in the condenser at the closure of the circuit has subsided.

The arrangement as shown in the drawing operates in the following manner. The resistor R connected in series with the condenser C limits the current rush produced at the moment of the switching-in of the network. As the exciting coil of the bridging switch Sch is cut into circuit simultaneously with the condenser, the bridging switch is after a short delay closed and short-circuits the resistor. Consequently, losses in the resistor R inserted before the condenser C are avoided in service.

It will be understood that if the above described arrangement for correcting the power factor is applied to polyphase transmission networks, the number of conductors of the network being greater, a plurality of devices according to my invention are connected between the various conductors of the network.

I claim as my invention:

1. A device for power-factor correction in an electric power circuit, comprising a condenser connected to the conductors of the power circuit, a resistor connected in series with said condenser and suitable for suppressing the current rush at the closure of the circuit, and means for short-circuiting said resistor when the circuit is closed and the current rush has subsided.

2. A device for power-factor correction in an electric power circuit, comprising a condenser connected to the conductors of the power circuit, a resistor connected in series with said condenser and suitable for suppressing the current rush at the closure of the circuit, and an electromagnetic bridging switch provided with contacts shunted across said resistor, and with an exciting winding suitable for obtaining voltage when the circuit is closed, said bridging switch being so dimensioned as to be cut in with a time lag only after the current rush at the closure of the circuit has died down.

3. A device for power-factor correction in an electric power circuit, comprising a condenser connected to the conductors of the power circuit, a resistor connected in series with said condenser and suitable for suppressing the current rush at the closure of the circuit, and an electromagnetic bridging switch provided with contacts shunted across said resistor, and with an exciting winding connected in parallel with said condenser.

4. The method of applying alternating-current voltage to a capacitor for power-factor correction in electric power circuits, which consists in inserting a resistor in series with said capacitor and suitable for suppressing the current rush at the closure of the circuit, then closing a circuit for applying voltage to the capacitor and resistor, and subsequently reducing the resistance of said series resistor when the circuit is closed and the current rush has subsided.

5. An electrostatic capacitor installation adapted to be connected to an alternating-current power line, comprising the combination, with said capacitor, of an auxiliary, current-limiting impedance device, means for connecting said capacitor to a power line with said impedance device in series with said capacitor, and means for subsequently reducing said series current-limiting impedance in the capacitor circuit.

6. An electrostatic capacitor installation adapted to be connected to an alternating-current power line, comprising the combination, with said capacitor, of a current-limiting resistor, means for connecting said capacitor to a power line with the said resistor in series circuit relation to said capacitor, so as to materially limit the initial current inrush to the capacitor, and an auxiliary switching means in shunt with said resistor whereby the latter may be subsequently short-circuited.

THEODOR KOPCZYNSKI.